(12) United States Patent
Taylor

(10) Patent No.: US 6,502,895 B2
(45) Date of Patent: Jan. 7, 2003

(54) UNITIZED BUS VEHICLE ROOF

(75) Inventor: Kermit O. Taylor, Fort Wayne, IN (US)

(73) Assignee: International Truck Intellectual Property Company, L.L.C., Warrenville, IL (US)

(*) Notice: Subject to any disclaimer, the term of this patent is extended or adjusted under 35 U.S.C. 154(b) by 0 days.

(21) Appl. No.: 10/079,725

(22) Filed: Feb. 21, 2002

(65) Prior Publication Data

US 2002/0117874 A1 Aug. 29, 2002

Related U.S. Application Data

(60) Provisional application No. 60/270,833, filed on Feb. 23, 2001.

(51) Int. Cl.⁷ .................................................. B60J 1/00
(52) U.S. Cl. ...................... 296/178; 296/210; 296/203.03
(58) Field of Search ................................ 296/178, 213, 296/197, 29, 210, 203.03; 29/469; 52/642

(56) References Cited

U.S. PATENT DOCUMENTS

| | | | | |
|---|---|---|---|---|
| 3,881,765 A | * | 5/1975 | Cerra et al. .................. 296/178 |
| 3,962,015 A | * | 6/1976 | Heimann ..................... 296/181 |
| 4,323,276 A | * | 4/1982 | Hira et al. ................... 296/214 |
| 4,351,558 A | * | 9/1982 | Mueller ....................... 296/187 |
| 4,425,001 A | * | 1/1984 | Mauri ......................... 296/178 |
| 4,444,705 A | * | 4/1984 | Kumasaka et al. ......... 264/46.5 |
| 4,610,478 A | * | 9/1986 | Tervol ......................... 296/214 |
| 4,862,653 A | * | 9/1989 | Pomento ....................... 52/642 |
| 4,874,200 A | * | 10/1989 | Nasu et al. .................. 296/197 |
| 4,883,310 A | * | 11/1989 | Miyazaki et al. ............. 29/469 |
| 4,900,083 A | * | 2/1990 | Kumasaka et al. ........... 29/469 |
| 5,000,507 A | * | 3/1991 | Baxter ........................ 296/104 |
| 5,018,781 A | * | 5/1991 | Kumasaka et al. .... 296/203.03 |
| 5,333,554 A | * | 8/1994 | Yamada et al. ............. 296/210 |
| 5,873,618 A | * | 2/1999 | Ejima .......................... 296/30 |
| 6,196,622 B1 | * | 3/2001 | Brodt et al. ........... 296/203.04 |
| 6,347,829 B1 | * | 2/2002 | Hanyu ........................ 296/210 |
| 6,350,048 B1 | * | 2/2002 | Stanton et al. .............. 362/478 |
| 2001/0033096 A1 | * | 10/2001 | Hanyu ................... 296/203.03 |
| 2002/0005656 A1 | * | 1/2002 | Seifert ........................ 296/210 |

* cited by examiner

*Primary Examiner*—Kiran Patel
(74) *Attorney, Agent, or Firm*—Jeffrey P. Calfa; Neil T. Powell; Dennis Kelly Sullivan

(57) ABSTRACT

A roof and mounting structure and a school or commercial bus vehicle provide improved leakage protection to the passenger compartment of the vehicle. The roof is an integral unitized roof structure that reduces or eliminates the opportunity for leakage by replacing rivets with adhesive or adhesive tape as the joining force between the roof skin and supporting structure and by decreasing the number of potential leakage points by decreasing the number of parts making up the roof from many overlapping panels to what is effectively a single sheet. This single unitized roof may actually be comprised of two strips of metal welded together or crimped together along a seam.

14 Claims, 3 Drawing Sheets

UNITIZED BUS VEHICLE ROOF

This is a non-provisional patent application claiming priority under provisional patent application serial number 60/270,833, filed Feb. 23, 2001.

BACKGROUND

This invention relates to school and transit bus roofs. More specifically, the invention involves an improvement to roofs for these mobile vehicles for the purpose of reducing moisture intrusion into the vehicles. The new roof is essentially a single integral sheet installed without the need for multiple holes and rivets.

PRIOR ART

Owners of school and commercial or transit buses have sometimes experienced leakage of moisture or water into the bus body passenger compartments. The nearly one thousand rivets and numerous joined parts in the traditional bus roof may result in leaks, high labor, and part costs. FIG. 1 shows such a prior art commercial bus 201. The prior art design bus body 202 roofs consisted of multiple sheets 203a, 203b, 203c, and 203d of metal to comprise the roof. This prior art design called for expanding sealant between skin panels and the interior structure. The rivets 205 and 207 were installed between the sheets 203a, 203b, 203c, and 203d and the interior structure at the overlapping edges 204 and 206. After the bus has been painted, workers apply additional sealant along the edges 204 and 206 of the joints. The large number of rivets 205 and 207 and the process and lack of easy access to properly apply the rivets 205 and 207 directly and perpendicular to the rivet holes increases the probability of leakage at the rivet holes and associated joints. A relatively large amount of original manufacturer rework is associated with this work. Variances in the amount of sealant applied also contribute to the leakage issues. The roof structure did not take advantage of incorporating upper body cowl 210 and window 208 and 209 installation into its construction. What has not been previously suggested is having an integral unitized roof structure for a school or commercial bus that reduces or eliminates the opportunity for leakage by replacing rivets with adhesive or adhesive tape as the joining force between the roof skin and supporting structure and by decreasing the number of potential leakage points by decreasing the number of parts making up the roof from many overlapping panels to what is effectively a single sheet.

SUMMARY

The roof and mounting structure of this invention and a school or commercial bus vehicle with these components installed satisfy the primary objective of this invention as follows. The roof is an integral unitized roof structure that reduces or eliminates the opportunity for leakage by replacing rivets with adhesive or adhesive tape as the joining force between the roof skin and supporting structure and by decreasing the number of potential leakage points by decreasing the number of parts making up the roof from many overlapping panels to what is effectively a single sheet. This single unitized roof may actually be comprised of two strips of metal welded together or crimped together along a seam.

DRAWINGS

Other objects and advantages of the invention will become more apparent upon perusal of the detailed description thereof and upon inspection of the drawings, in which.

DETAILS OF INVENTION

Figure 1:
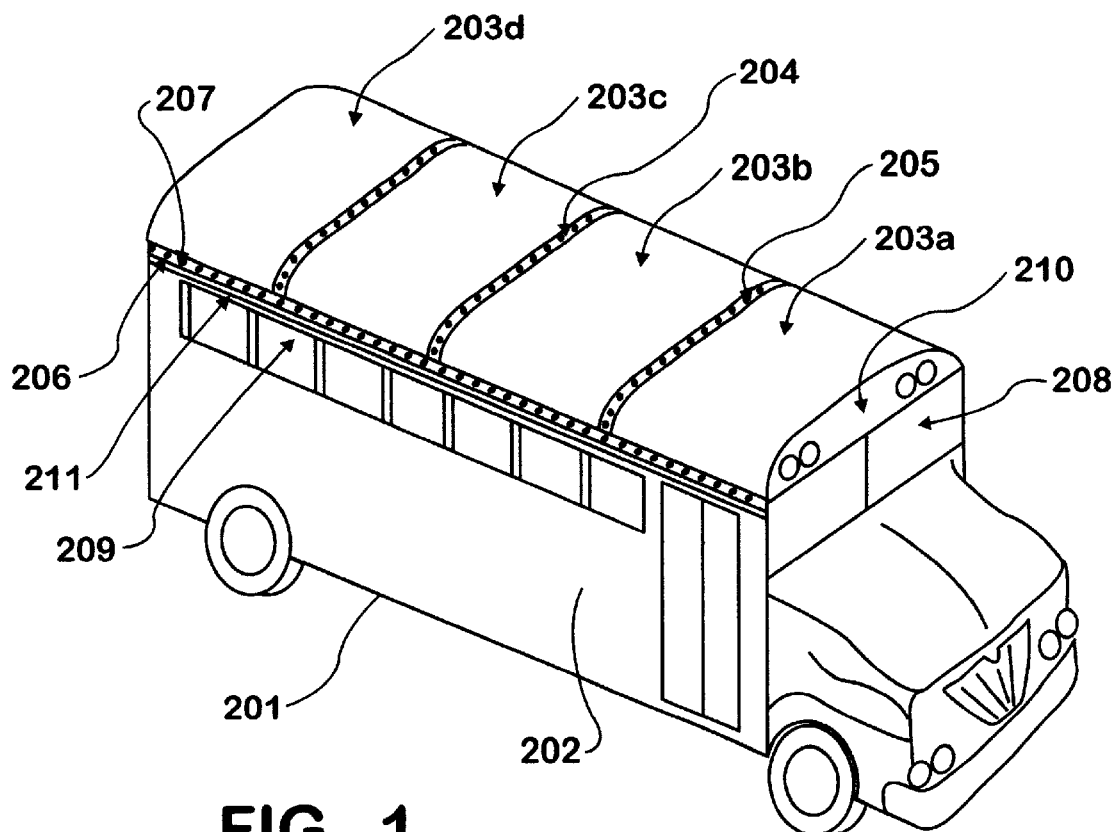
FIG. 1 is a perspective view of a prior art school or commercial bus.
Figure 2:
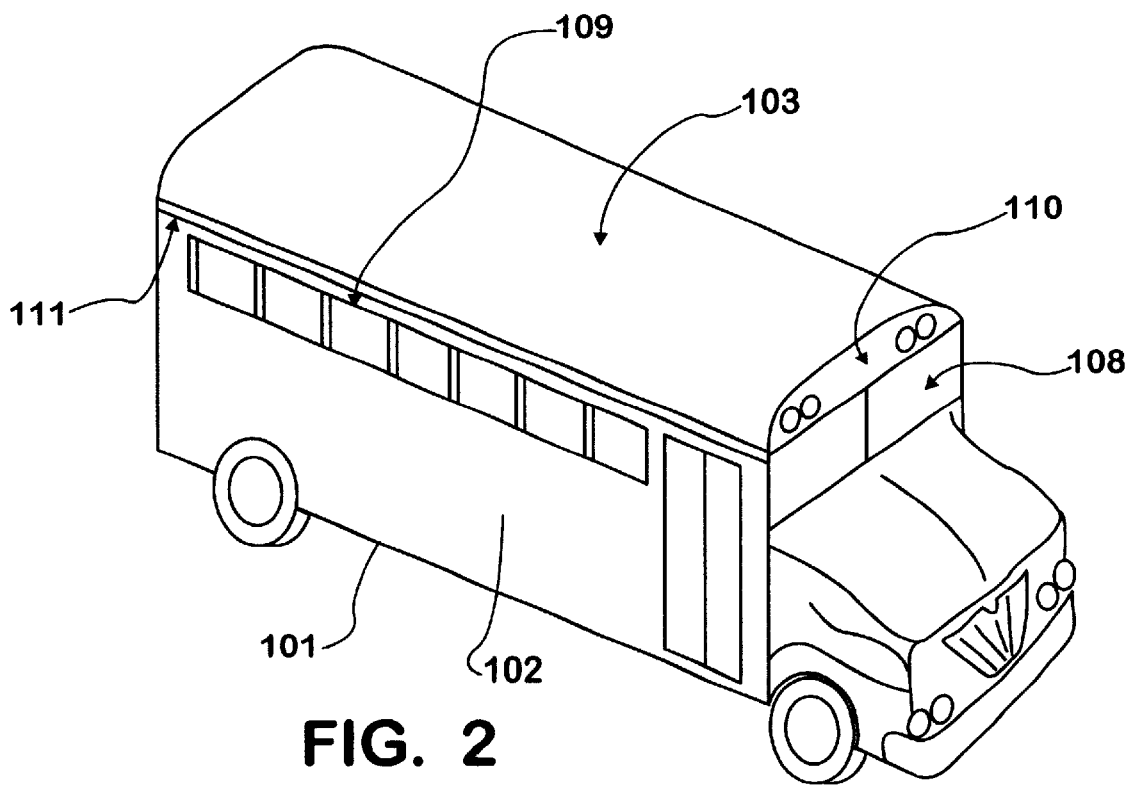
FIG. 2 is a perspective view of a school or commercial bus vehicle with an integral unitized roof structure made in accordance with this invention.
Figure 3:
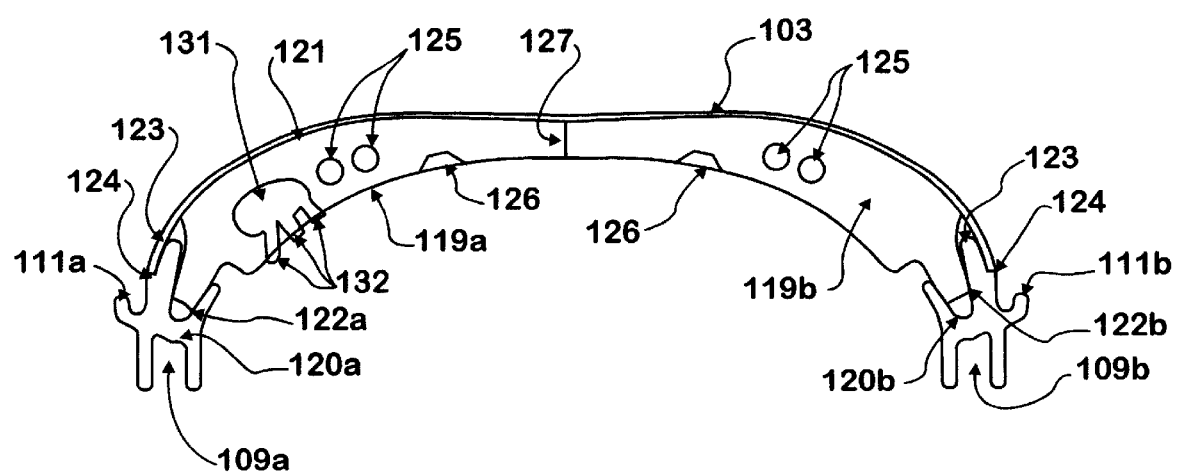
FIG. 3 is an end on cutaway view of the integral unitized roof structure of the vehicle of FIG. 2.

The integral unitized roof structure 103 of this invention may be installed on any commercial of school bus vehicle 101. FIGS. 1 and 2 show such a roof 103 structure installed on a vehicle 101. The vehicle 101 has a body 102. There roof 103 is engaged to right and left body rails 120a and 120b that run the length of the vehicle 101. The body rails 120a and 120b run along each upper side of the body 102. The body rails 120a and 120b are engaged to a front windshield 108 and upper body cowl 110 in the front and the tops of the window 109 frames along the vehicle 101.

The roof 103 is an integral unitized roof structure that reduces or eliminates the opportunity for leakage by replacing rivets with adhesive or adhesive tape 121 as the joining force between the roof skin 103 and supporting structure 119a and 119b and by decreasing the number of potential leakage points by decreasing the number of parts making up the roof 103 from many overlapping panels to what is effectively a single sheet. The supporting structure may be comprised of sets of two-frame bow cross members, a right frame cross member 119a and a left frame cross member 119b. The outer ends of the frame cross members 119a and 119b rest within right and left upper receiving notches 122a and 122b of the body rails 120a and 120b. The inner ends of the frame cross members 119a and 119b are joined at an intersection surface 127. The frame cross members 119a and 119b may be a single piece. The single sheet unitized roof skin 103 is engaged to the upper surface of the respective frame cross members 119a and 119b through an adhesive or and adhesive tape 121. The body rails 120a and 120b may have a roof skin engagement notch 124-for receiving an adhesive or adhesive tape to engage to the outer edges of the roof skin 103. The outer edges of the roof skin 103 rests on the upper engagement area 123 of the body rails 120a and 120b. The single unitized roof 103 may actually be comprised of two strips of metal welded together or crimped together along a seam.

The body rails 120a and 120b may include window right and left frame slots 109a and 109b, respectively, on a lower side of the body rails 120a and 120b. The upper portions of the window frames 109 will be inserted into the right and left frame slots 109a and 109b. The body rails 120a and 120b would in this embodiment act as construction spines for the entire body construction. In one embodiment, the body rails 120a and 120b are made from an extruded material, and the extrusion includes integral extruded rain gutters 111a and 111b.

The frame cross members 119a and 119b may contain electrical wire passages 125 and recessed track lighting 126. These wire passages 125 and the track lighting 126 may run the length of the vehicle body 102 allowing for an additional modular aspect. The wire passages 125 and track lighting 126 would bridge between frame cross members 119a and 119b. Alternatively, or additionally, the frame cross members 119a and 119b may include air ventilation ducts 131 that pass through the frame cross members 119a and 119b. These ducts 131 may also run the length of the body 102 and bridge between frame cross members 119a and 119b. The ducts 131 may also include snap in vents 132.

The roof skin 103 and related structural design of the vehicle 101 as shown results in the removal of literally a thousand of potential leak paths into the vehicle 101 as the prior art involves using approximately 1000 rivets. Application of the prior art rivets 205 and 207 could sometimes be nonperpendicular to the separate roof panels 203a–d of the prior art. The biggest change to prior art manufacturing would be that space would have to be allocated for forming and subassembly of the roof. The roof skin 103 can be built off of a main assembly line. Instead of overlapping strips of metal to comprise the roof, the new process would begin with rolls of sheet metal. These rolls can be joined as necessary by welding or other techniques to produce the desired width for the vehicle 101. The material then proceeds through a forming station to establish a general roof profile. Emerging from the forming process, the roof skin 103 is cut to the desired length according to customer required length of the vehicle 101, not requiring unique designs of skin panels to total the length of the constant section of the vehicle 101. This minimizes part count as well as reducing inventory, material handling, and assembly process steps.

As described above, the integral unitized roof structure 103, and the vehicle 101 with these components installed provide a number of advantages, some of which have been described above and others of which are inherent in the invention. Also modifications may be proposed to the integral unitized roof structure 103, and the vehicle 101 with this system installed with these components installed without departing from the teachings herein.

I claim:

1. An integral unitized roof structure and vehicle in combination, comprising:
    a vehicle body;
    a pair of body rails running along each side of an upper portion of said body;
    said body rails run an entire length of said vehicle body;
    said body rails being engaged to a front windshield and upper body cowl in the front and upper sides of window frames along said vehicle;
    a roof supporting structure comprised of sets of frame bow cross members, outer ends of-said frame cross members resting within upper receiving notches of said body rails and inner ends of said frame cross members joining at an intersection surface; and
    a single sheet unitized roof skin engaged to an upper surface of said respective frame cross members through an adhesive.

2. The roof and vehicle combination of claim 1, wherein:
    said body rails having a roof skin engagement notch for receiving said adhesive engaging outer edges of said roof skin.

3. The roof and vehicle combination of claim 2, wherein:
    outer edges of said roof skin rest on upper engagement area of said body rails.

4. The roof and vehicle combination of claim 3, wherein:
    said frame cross member sets each being a single piece comprised of a left side and right side.

5. The roof and vehicle combination of claim 4, wherein:
    said adhesive is an adhesive tape.

6. The roof and vehicle combination of claim 5, wherein:
    said body rails including window frame slots on a lower side of said body rails; and
    and upper portions of vehicle window frames being inserted into said window frame slots on construction.

7. An integral unitized roof structure and vehicle in combination, comprising:
    a vehicle body;
    a pair of body rails running along each side of an upper portion of said body;
    said body rails run an entire length of said vehicle body;
    a roof supporting structure comprised of frame bow cross members, outer ends of said frame cross members resting within upper receiving notches of said body rails;
    a single sheet unitized roof skin engaged to an upper surface of said respective frame cross members through an adhesive;
    said body rails having a roof skin engagement notch for receiving said adhesive engaging outer edges of said roof skin; and
    outer edges of said roof skin rest on upper engagement area of said body rails.

8. The roof and vehicle combination of claim 7, wherein:
    said frame cross members containing electrical wire passages running through said body and bridging between consecutive frame cross members.

9. The roof and vehicle combination of claim 8, wherein:
    said frame cross members containing recessed track lighting running through said body and bridging between consecutive frame cross members.

10. The roof and vehicle combination of claim 9, wherein:
    said frame cross members containing air ventilation ducts passing through said frame cross members.

11. The roof and vehicle combination of claim 10, wherein:
    said body rails including window frame slots on a lower side of said body rails; and
    and upper portions of vehicle window frames being inserted into said window frame slots on construction, 12. An integral unitized roof structure and vehicle in combination, comprising:
    a vehicle body;
    a pair of body rails running along each side of an upper portion of said body;
    said body rails run an entire length of said vehicle body;
    said body rails being engaged to a front windshield and upper body cowl in the front and upper sides of window frames along said vehicle;
    a roof supporting structure comprised of sets of frame bow cross members, outer ends of said frame cross members resting within upper receiving notches of said body rails and inner ends of said frame cross members joining at an intersection surface;
    a single sheet unitized roof skin engaged to an upper surface of said respective frame cross members through an adhesive;
    said body rails having a roof skin engagement notch for receiving said adhesive engaging outer edges of said roof skin;
    outer edges of said roof skin rest on upper engagement area of said body rails;
    said adhesive is an adhesive tape;
    said body rails including window frame slots on a lower side of said body rails;

and upper portions of vehicle window frames being inserted into said window frame slots on construction; and said frame cross members containing air ventilation ducts passing through said frame cross members.

13. The roof and vehicle combination of claim 12, wherein:

said frame cross members containing electrical wire passages running through said body and bridging between consecutive frame cross members; and said frame cross members containing recessed track lighting running through said body and bridging between consecutive frame cross members.

14. The roof and vehicle combination of claim 12, wherein:

said body rails being made from an extruded material; and said extruded body rails include integral extruded rain gutters.

\* \* \* \* \*